April 7, 1964        G. F. MEYER        3,128,370
GAS CUP ASSEMBLY FOR WELDING GUN
Filed June 21, 1963
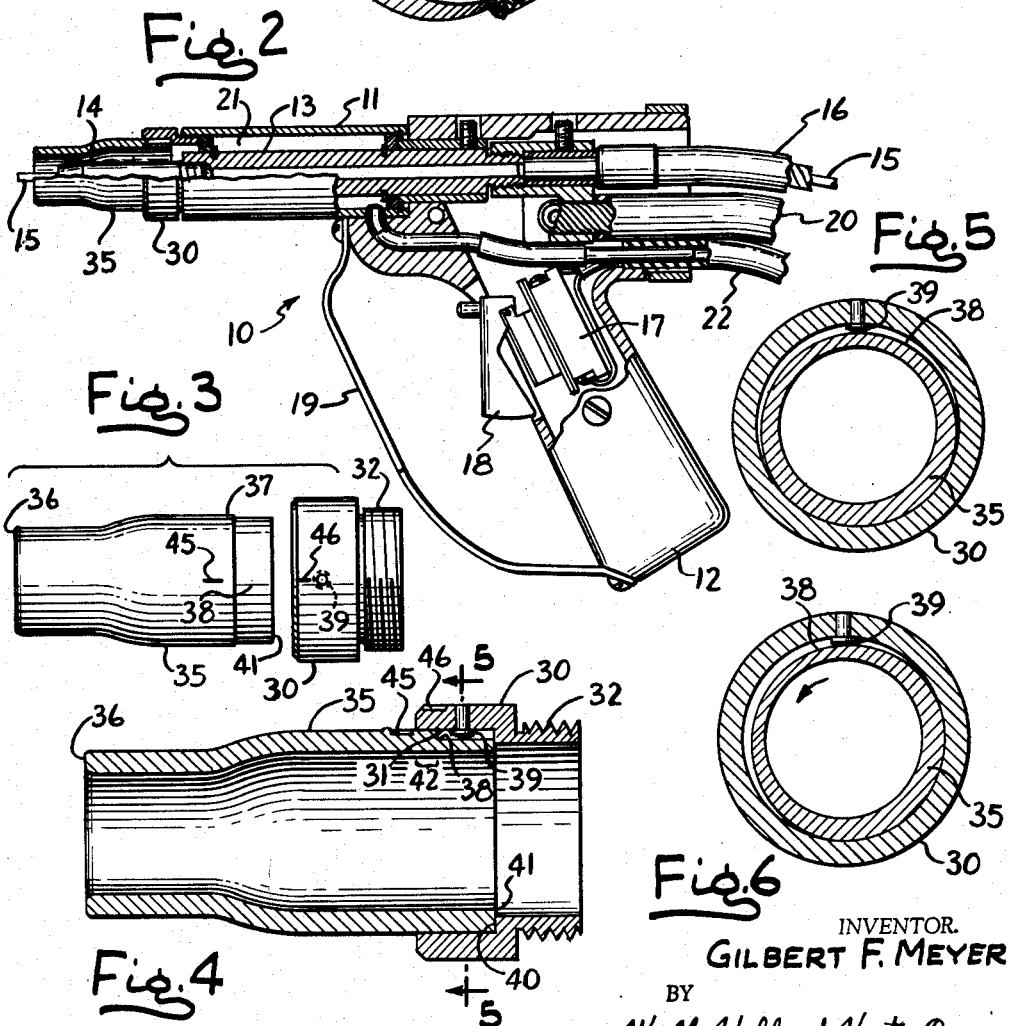
INVENTOR.
GILBERT F. MEYER
BY
Wolfe, Hubbard, Voit & Osann
ATTYS.

United States Patent Office 3,128,370
Patented Apr. 7, 1964

3,128,370
GAS CUP ASSEMBLY FOR WELDING GUN
Gilbert F. Meyer, Milwaukee, Wis., assignor to Machinery and Welder Corporation, Skokie, Ill., a corporation of Missouri
Filed June 21, 1963, Ser. No. 289,611
3 Claims. (Cl. 219—130)

The present invention relates to welding guns and more specifically to a gas-directing tip or shield assembly for guns of the continuous wire-feed type.

Manual welding guns are in common usage in which the welding wire is fed axially through the gun in a continuous length and under the control of a trigger or the like. For the purpose of shielding the arc an inert gas is fed to the gun for discharge through a so called "gas cup" which surrounds the wire at the point of exit and which is specially shaped to provide a stream which is coordinated with the wire size and the other welding conditions. Conventional gas cups are made of copper, brass, or other good conducting metal. However, because of their exposed position, the proximity to the weld and the necessity for changing the cup when making a change in the welding conditions, it is desirable to provide a gas cup which allows for quick and easy replacement so that the "down" time of the welding gun is minimized.

The primary object of the present invention is to provide an improved gas cup construction for a welding gun which may be quickly and easily removed and replaced when replacement becomes necessary. It is a more specific object of the invention to provide a gas cup which may be easily and positively secured in working position, which remains secure in spite of the wide temperature changes and in spite of the physical blows to which the cup may be subjected in use. More specifically, it is an object to provide a gas cup assembly which permits the cup to be readily removed, free of the effects of corrosion, oxidation and the like. More specifically, it is an object to provide a gas cup construction which permits assembly and disassembly by hand without necessity for resorting to wrenches or other tools and requiring only a simple twisting action for seating and unseating.

It is another object of the present invention to provide a gas cup construction for a welding gun which is of general utility and which may be readily applied to welding guns of different constructions.

It is still another object of the present invention to provide a gas cup which may be economically manufactured and which does not require adherence to close tolerances. Nevertheless it is an object to provide a gas cup which enables a substantially gas-tight connection at the usual operating gas pressures and which produces close thermal coupling between the cup and the structure of the gun so that the gun may be used for long periods of time without any excessive temperature buildup.

Other objects and advantages of the invention will become apparent upon reading the attached detailed description and upon reference to the drawings in which:

FIGURE 1 is an external view of a welding gun employing the present invention.

FIG. 2 is a view similar to FIG. 1 but showing the gun in partial section.

FIG. 3 is a top view of the gas cup assembly in exploded relation showing the use of the index lines to secure alinement prior to assembly.

FIG. 4 is an enlarged longitudinal section taken through the gas cup assembly.

FIG. 5 is a transverse section taken along the line 5—5 in FIG. 4 prior to twisting the cup into seated position.

FIG. 6 is a transverse section similar to FIG. 5 but showing the cup in final seated and secured position.

While the invention has been described in connection with a preferred embodiment, it will be understood that the invention is not limited to the particular form illustrated but I do, on the contrary, intend to cover the various modifications and alternative constructions included within the spirit and scope of the appended claims.

Turning now to FIGS. 1 and 2, there is shown a welding gun having a frame which includes a barrel 11 and a pistol grip 12. Extending centrally within the barrel is a head tube 13 having a contact tip 14 and which conducts a continuous length of welding wire 15. The welding wire is fed from a suitable source through a flexible guide tube 16. For the purpose of advancing the wire, a suitable motor drive (not shown) is provided at the source under the control of a switch 17 having a trigger 18 which is, as shown, built into the pistol grip. A heat shield 19 serves to shield the hand of the user from the radiant heat at the weld. Current is conducted to the contact tip 14 through a power cable 20 which may, if desired, be liquid cooled.

For the purpose of conducting shielding gas to the region of the weld, an annular gas chamber 21 is provided within the gun barrel and in communication with a flexible gas conduit 22 which is connected to a source of gas under slight pressure. In use, the welding wire 15 is fed out from the front end of the gun under the control of the trigger 16 and surrounded by shielding gas flowing from the space 21 which surrounds the wire feeding means of the gun.

In accordance with the present invention, a gas cup assembly is provided at the front end of the gun including a cylindrical socket and a cylindrical gas cup dimensioned to fit into the socket, the base portion of the cup being undercut with an eccentric profile to form a ramp and a radial protuberance being provided within the socket for crowding against the ramp when the cup is rotated so that the latter is frictionally held in seated position. Thus, referring to the drawing there is provided a socket 30 of cylindrical shape having an inner wall 31 and a threaded connection 32 for screwing into the front end of the gun. The gas cup, indicated at 35, is in the form of a cylinder having a tip 36 and a base portion 37 dimensioned to fit freely into the socket. At the end of the base portion 37, the cup is undercut or relieved along an eccentric profile as indicated at 38. In radial alinement with the relieved surface 38 is a protuberance 39 which is preferably in the form of a small headed element press fitted into a bore in the wall of the socket.

For the purpose of providing an endwise seat for the gas cup, the socket is preferably formed with an internal shoulder 40 which engages the presented end 41 of the cup. It will be noted that when the cup is fully inserted into the socket there is a substantial degree of overlap, as indicated at 42, of the socket with respect to the outer wall of the cup. The fit at 41, 42, under operating conditions, is sufficiently close so that there is negligible leakage of gas at the near-atmospheric pressure existing in the region of the joint.

For the purpose of facilitating assembly of the cup and socket to insure clearance between the protuberance and the inserted end of the cup, the cup and socket are preferably provided with index marks as indicated at 45, 46 (FIG. 3). These marks are visually alined before the parts are telescoped together.

To install a gas cup in the present assembly the cup 35 is simply inserted endwise into the socket with the index marks generally alined with one another until seating is felt at the shoulder 40. The cup is thereupon rotated using ordinary hand pressure which causes the eccentric ramp surface 38 to crowd against the protuberance 39. Since the eccentric ramp surface is symmetrical, the cup may be rotated in either direction to effect the locking action. It is found that with only a small amount of torque the cup is positively held in its seated position where it remains until it is intentionally removed. It will be apparent to one skilled in the art that the force which may be developed at the protuberance depends upon the shallowness of the ramp. In FIGS. 5 and 6 a relatively steep ramp has been illustrated in order to more clearly bring out the construction. In practice, it is found that the cup remains secure over a long period of time and in spite of the wide changes in temperature to which it is subjected as the gun is repeatedly turned on and off during the course of normal usage. Moreover, it is found that the locking engagement remains secure in spite of the blows to which the cup may be subjected in its exposed position at the front end of the gun.

When, because of wear or damage to the cup because of the change in welding conditions, it is desirable to replace the cup, it is a simple matter for the operator to manually rotate the cup so that the index marks 45, 46 are again in alinement following which the cup may be readily withdrawn. It is found that disengagement may be accomplished quickly and without recourse to any tools even where the cup has been in service for a long period of time and in spite of the effects of corrosion or the like. Thus the construction is to be distinguished from that which employs screw threads and where the threads are prone to become stuck after a period of use.

The coupling described above is not only mechanically secure but also provides good thermal coupling between the cup and the frame of the gun which is cooled by gas flow so that there is no tendency toward temperature buildup which would have the effect of shortening the life of the cup.

The present construction is well adapted for use on guns of various types and designs with little or no modification. A snug fit is assured even though the protuberance may, through repeated use, become slightly worn. Moreover, it is found that the locking mechanism is self explanatory so that it is readily understood by the operator of the gun without explanation or instruction. Finally, the cups may be produced and sold at low cost since there is no need to adhere to close manufacturing tolerances.

I claim as my invention:

1. In a welding gun of the type having a frame and having means for feeding a continuous length of welding wire axially from the front end thereof as well as means for conducting shielding gas thereto, the combination comprising a cylindrical socket secured to the front end of the gun and having an inner wall, a cylindrical gas cup having a base portion dimensioned to fit into said socket, the end of the base portion being undercut with a profile which is eccentric with respect to the cup axis to form a peripheral ramp, a radial protuberance on the inner wall of the socket and registering with the ramp when the cup is inserted into the socket so that when the cup is manually rotated from a registering position the crowding engagement between the ramp and the protuberance causes the cup to be frictionally locked in seated position.

2. In a welding gun of the type having a frame and having means for feeding a continuous length of welding wire axially from the front end thereof as well as means for conducting shielding gas thereto, the combination comprising a socket secured to the front end of the gun and having a cylindrical inner wall terminating in an internal shoulder, a cylindrical gas cup having a base portion dimensioned to fit into said socket, the end of the base portion being peripherally undercut with a profile which is eccentric with respect to the cup axis to form a peripheral ramp having a point of maximum radial depth, a radial protuberance on the inner wall of the socket, indices on the socket and on the cup to indicate a condition of alinement between the protuberance and the point of maximum depth to insure clearance of the protuberance when the cup is inserted into the socket and seated against the shoulder, so that when the cup is subsequently manually rotated from the indexed position the ramp crowds against the protuberance for frictional locking of the cup in its seated position.

3. In a welding gun of the type having a frame and having means for feeding a continuous length of welding wire axially from the front end thereof as well as means for conducting shielding gas thereto, the combination comprising a socket secured to the front end of the gun having a cylindrical inner wall, a cylindrical gas cup having a base portion dimensioned to fit into said socket, one of the members including the socket and cup being formed with a peripheral ramp and the remaining member having a protuberance radially alined with the ramp so that when the cup is rotated in the socket the ramp crowds against the protuberance for frictional locking of the cup in the socket.

References Cited in the file of this patent

UNITED STATES PATENTS

| | | |
|---|---|---|
| 1,558,334 | Boss et al. | Oct. 20, 1925 |
| 2,470,603 | Coulter et al. | May 17, 1949 |
| 3,093,728 | Adamson | June 11, 1963 |